(12) United States Patent
Sandler et al.

(10) Patent No.: US 8,386,495 B1
(45) Date of Patent: Feb. 26, 2013

(54) AUGMENTED RESOURCE GRAPH FOR SCORING RESOURCES

(75) Inventors: Mark M. Sandler, Jersey City, NJ (US); Dandapani Sivakumar, Cupertino, CA (US)

(73) Assignee: Google Inc., Mountain View, CA (US)

( * ) Notice: Subject to any disclaimer, the term of this patent is extended or adjusted under 35 U.S.C. 154(b) by 263 days.

(21) Appl. No.: 12/766,775

(22) Filed: Apr. 23, 2010

(51) Int. Cl.
*G06F 17/30* (2006.01)

(52) U.S. Cl. ........................................ 707/748; 707/798

(58) Field of Classification Search .................. 707/748, 707/798
See application file for complete search history.

(56) References Cited

U.S. PATENT DOCUMENTS

| | | | |
|---|---|---|---|
| 6,285,999 B1 | 9/2001 | Page | |
| 7,028,029 B2 * | 4/2006 | Kamvar et al. | 1/1 |
| 7,216,123 B2 * | 5/2007 | Kamvar et al. | 1/1 |
| 7,565,627 B2 * | 7/2009 | Brill et al. | 715/854 |
| 7,617,194 B2 * | 11/2009 | Liu et al. | 1/1 |
| 7,720,857 B2 * | 5/2010 | Beringer et al. | 707/766 |
| 7,818,334 B2 * | 10/2010 | Najork | 707/765 |
| 7,822,774 B2 * | 10/2010 | Craswell et al. | 707/791 |
| 7,836,058 B2 * | 11/2010 | Chellapilla et al. | 707/748 |
| 7,849,025 B2 * | 12/2010 | Mihalkova et al. | 706/12 |
| 7,853,622 B1 * | 12/2010 | Baluja et al. | 707/803 |
| 7,877,385 B2 * | 1/2011 | Craswell et al. | 707/726 |
| 7,895,235 B2 * | 2/2011 | Baeza-Yates et al. | 707/791 |
| 7,945,565 B2 * | 5/2011 | Poblete et al. | 707/722 |
| 7,953,746 B1 * | 5/2011 | Garg et al. | 707/762 |
| 8,055,664 B2 * | 11/2011 | Baluja et al. | 707/749 |
| 8,060,503 B2 * | 11/2011 | Stergiou et al. | 707/726 |
| 8,099,417 B2 * | 1/2012 | Gollapudi et al. | 707/748 |
| 8,126,926 B2 * | 2/2012 | Atre et al. | 707/798 |
| 8,176,069 B2 * | 5/2012 | Timm et al. | 707/767 |
| 2003/0014399 A1 * | 1/2003 | Hansen et al. | 707/3 |
| 2005/0114384 A1 * | 5/2005 | Beringer et al. | 707/102 |
| 2005/0131762 A1 * | 6/2005 | Bharat et al. | 705/14 |
| 2005/0251805 A1 * | 11/2005 | Bamba et al. | 718/100 |
| 2006/0074870 A1 * | 4/2006 | Brill et al. | 707/3 |
| 2006/0277175 A1 * | 12/2006 | Jiang et al. | 707/5 |
| 2007/0112730 A1 * | 5/2007 | Gulli et al. | 707/3 |
| 2007/0112768 A1 * | 5/2007 | Majumder | 707/7 |
| 2008/0183695 A1 * | 7/2008 | Jadhav | 707/5 |
| 2008/0256056 A1 * | 10/2008 | Chang et al. | 707/5 |
| 2008/0256061 A1 * | 10/2008 | Chang et al. | 707/5 |
| 2009/0070323 A1 * | 3/2009 | Parikh et al. | 707/5 |

(Continued)

OTHER PUBLICATIONS

Zhao et al., "Adapting Document Ranking to Users' Preferences Using Click-Through Data", CIKM'04, Nov. 8-13, 2004, 17 pages.*

(Continued)

*Primary Examiner* — Phuong Thao Cao
(74) *Attorney, Agent, or Firm* — Fish & Richardson P.C.

(57) ABSTRACT

Methods, systems, and apparatus, including computer programs encoded on computer storage media, for scoring resources. One method includes generating a resource graph, the graph including nodes representing resources, nodes representing queries, edges between nodes representing resources, and edges between nodes representing queries and nodes representing resources. The method further includes calculating a score for each of the resources, wherein the score for a particular resource is based on scores for resources represented by nodes with edges to the node representing particular resource in the graph and scores for queries represented by nodes that have an edge to the node representing particular resource in the graph, and ranking one or more of the resources in response to a first query received from a user based, at least in part, on the scores.

19 Claims, 6 Drawing Sheets

U.S. PATENT DOCUMENTS

| | | | |
|---|---|---|---|
| 2009/0157643 A1* | 6/2009 | Gollapudi et al. | 707/5 |
| 2009/0228474 A1* | 9/2009 | Chiu et al. | 707/5 |
| 2009/0259646 A1* | 10/2009 | Fujita et al. | 707/5 |
| 2009/0276389 A1* | 11/2009 | Constantine et al. | 706/52 |
| 2010/0082604 A1* | 4/2010 | Gutt et al. | 707/721 |
| 2010/0082694 A1* | 4/2010 | Corsi et al. | 707/798 |
| 2010/0082752 A1* | 4/2010 | Donato et al. | 709/206 |
| 2010/0106719 A1* | 4/2010 | Donato et al. | 707/728 |
| 2010/0125572 A1* | 5/2010 | Poblete et al. | 707/722 |
| 2010/0145771 A1* | 6/2010 | Fligler et al. | 705/10 |
| 2010/0185649 A1* | 7/2010 | Zhou et al. | 707/769 |
| 2010/0241647 A1* | 9/2010 | Ntoulas et al. | 707/765 |
| 2010/0325133 A1* | 12/2010 | Rounthwaite et al. | 707/759 |
| 2011/0004692 A1* | 1/2011 | Occhino et al. | 709/228 |
| 2011/0167054 A1* | 7/2011 | Bailey et al. | 707/710 |
| 2011/0258148 A1* | 10/2011 | Gao et al. | 706/12 |
| 2011/0302172 A1* | 12/2011 | Chandrasekar et al. | 707/748 |

OTHER PUBLICATIONS

Sidiropoulos et al., "Generalized Comparison of Graph-Based Ranking Algorithms for Publications and Authors", The Journal of Systems and Software 79 (2006), pp. 1679-1700 (22 pages).*

Daoud et al., "A Personalized Graph-based Document Ranking Model Using a Semantic User Profile", UMAP 2010, LNCS 6075, pp. 171-182, 2010, accessed online at <ftp://irit.fr/IRIT/SIG/UMAP2010.pdf> on Jun. 21, 2012.*

Guan et al., "Personalized Tag Recommendation Using Graph-based Ranking on Multi-type Interrelated Objects", SIGIR'09, Jul. 19-23, 2009, ACM, 8 pages, accessed online at <http://www-personal.umich.edu/~qmei/pub/sigir09-tag.pdf> on Jun. 21, 2012.*

Poblete et al., "Dr. Searcher and Mr. Browser: A Unified Hyperlink-Click Graph", In Proceedings of the 17th ACM Conference on Information and Knowledge Management (CIKM '08), Oct. 2008, pp. 1123-1132 (10 pages).*

Xie et al., "Semi-Supervised Graph-Ranking for Text Retrieval", Lecture Notes in Computer Science (LNCS) 4993, 2008, pp. 256-263 (8 pages).*

Billerbeck et al., "Ranking Entities Using Web Search Query Logs", In Proceedings of the 14th European Conference on Research and Advanced Technology for Digital Libraries (ECDL '10), Sep. 6-10, 2010, pp. 273-281 (8 pages).*

Liu et al. 2008. "BrowseRank: Letting web users vote for page importance." Proceedings of the $31^{st}$ annual international ACM SIGIR conference on Research and Development in Information Retrieval (SIGIR '08). ACM, New York, NY, USA, 451-458.

U.S. Appl. No. 11/546,755, filed Oct. 12, 2006, Hajaj.

U.S. Appl. No. 12/537,717, filed Aug. 7, 2009, Alpert et al.

* cited by examiner

AUGMENTED RESOURCE GRAPH FOR SCORING RESOURCES

BACKGROUND

This specification relates to scoring web resources.

Internet search engines provide information about Internet accessible resources (e.g., Web pages, images, text documents, and multimedia content) that are responsive to a user's search query by returning a set of search results in response to the query. A search result includes, for example, a Uniform Resource Locator (URL) and a snippet of information for resources responsive to a query.

Internet search engines rank resources according to a result score associated with the resource. The result score can be a query independent measure of the quality of the resource, a query specific measure of how well the resource matches a user's search query, or a score derived from both a query independent measure and a query specific measure.

Some Internet search engines determine a query-independent score for a resource using a web resource graph having nodes corresponding to resources and edges corresponding to links between resources. However, these web resource graphs do not explicitly represent other ways users navigate between resources.

SUMMARY

In general, one innovative aspect of the subject matter described in this specification can be embodied in methods that include the actions of generating a resource graph, the graph including nodes representing resources, nodes representing queries for resources, edges between nodes representing resources, and edges between nodes representing queries and nodes representing resources, wherein each edge between two nodes representing respective resources represents a link from one of the resources to the other resource and each edge between a node representing a resource and a node representing a query represents a user selection of a search result for the resource from search results responsive to the query; calculating a score for each of the resources, wherein the score for a particular resource is based on scores for resources represented by nodes with edges to the node representing particular resource in the graph and scores for queries represented by nodes that have an edge to the node representing particular resource in the graph; and ranking one or more of the resources in response to a first query received from a user based, at least in part, on the scores. Other embodiments of this aspect include corresponding systems, apparatus, and computer programs recorded on computer storage devices, each configured to perform the operations of the methods.

These and other embodiments can each optionally include one or more of the following features. The edge between two nodes representing respective resources can be a directed edge from the node representing one of the resources to the node representing the other resource. The graph can further include nodes representing user sessions and edges between nodes representing user sessions and nodes representing queries, wherein each edge between a node representing a user session and a node representing a query represents that a user submitted the query during the user session. The graph can further include nodes representing users and edges between nodes representing users and nodes representing queries, wherein each edge between a node representing a user and a node representing a query represents that the user submitted the query.

Each edge can have an associated weight, and calculating a score for a resource can be further based on the weight of the edges from nodes to the node representing the resource. The weight of an edge between a node representing a first resource and a node representing a second resource can be derived from a number of outbound links from the first resource to other resources. The weight of an edge between a node representing a query and a node representing a resource can be derived from a quality of result statistic for the resource and the query. The quality of result statistic for the resource and the query can be a click through rate for the resource and the query. Calculating a score for each of the resources can include iteratively updating the scores of the web resources and queries. Calculating a score for each of the resources comprises initializing a score for each node in the graph, wherein the score for each node is one divided by a total number of nodes in the graph; and iteratively updating a score for each node, wherein the updated score for each node is derived from a weighted average of scores of nodes with edges to the node.

Particular embodiments of the subject matter described in this specification can be implemented so as to realize one or more of the following advantages. The addition of other types of nodes and edges to a resource graph, e.g., nodes for queries, users, or user sessions and edges between queries and resources, users and queries, or user sessions and queries provides additional information to a scoring algorithm run on the graph. For example, with an example generic scoring algorithm, a given resource is assigned a score based on the scores of the resources that link to the given resource. The more resources that link to the given resource, or the higher their scores, the higher the score for the given resource will be. The addition of other nodes in the graph provides additional information. The more query nodes that link to a resource node, and the higher the scores of those query nodes, the more important the resource node is determined to be and higher the score of the resource node will be. Similarly, the more users or user session nodes that link to a query, and the higher the scores of the user nodes or user session nodes, the more important the query node is determined to be, and the higher the score of the query node will be. This means that more accurate scores can be generated for web resources, in particular for web resources with few links to them. These scores can reflect both the links between resources and user search behavior.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Scoring System Overview

Figure 1:
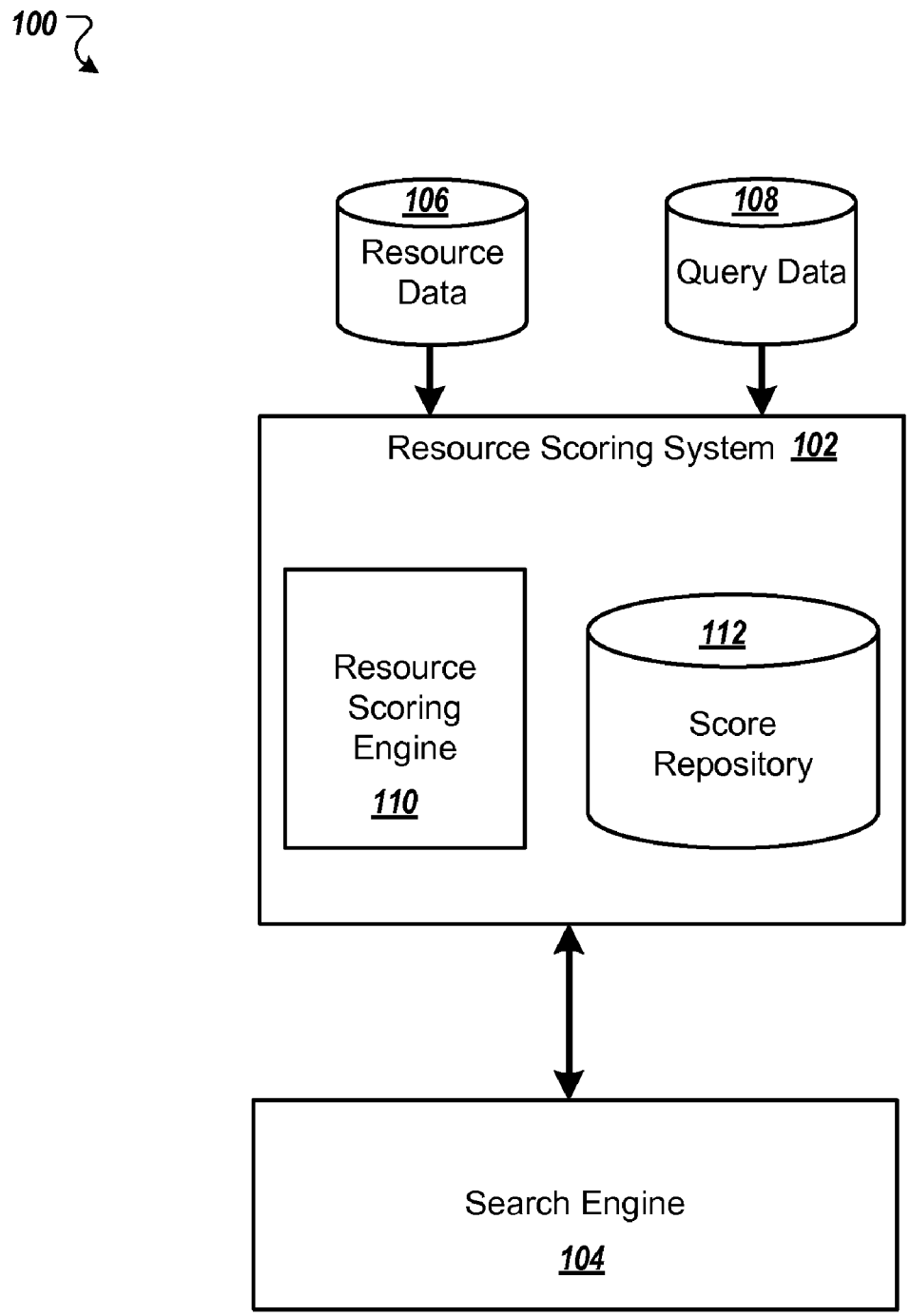
FIG. 1 is a block diagram of an example system for scoring and retrieving resources responsive to a user search query.

FIG. 1 is a block diagram of an example system 100 for scoring and retrieving web resources responsive to a user search query. A resource is any data that can be provided by a website or other source, e.g., over a network, and that is associated with a resource address. Resources include HTML pages, word processing documents, portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

Each resource is addressed by a resource locator, such as a universal resource locator (URL). A resource locator is a string of characters that identifies a resource and provides a means for locating the resource. The resource locator includes a resource name, such as a host name and a path of the resource. In the context of a URL, for example, the resource name follows the protocol name, and includes the host name, the path name, and the file name of the resource. The host name identifies the computer host that manages the resource, and typically ends in a domain name. For example, the domain name "example.com" may have host names corresponding to languages or countries, such as en.example.com, de.example.com, fr.example.com, and so on. The path name identifies a directory where the resource is located. The file name is the name of the resource.

The system 100 includes resource scoring system 102 and search engine 104. Resource scoring system 102 receives resource data 106 and query data 108 and generates scores for the resources from the received data.

The resource data 106 includes identifications of resources indexed by a search system. The data further includes, for each resource, an identification of any resources linked to or from the resource, e.g., by anchors in the resource. The data for a resource can further include other information, for example, data describing the contents of the resource. In some implementations, the resource data 106 is generated by the search system, for example, during a web crawl. An example search system is described in more detail below with reference to FIG. 6.

The query data 108 identifies queries submitted by users and associates each query with search results selected by users from a list of search results presented in response to the query. The search results can be identified and presented, for example, by a search system. An example search system is described in more detail below with reference to FIG. 6.

In some implementations, the query data 108 also associates queries with the user identifiers of users who submitted the queries. The query data 108 is preferably anonymized for privacy protection. For example, each user can be identified by an Internet protocol (IP) address of a corresponding user device used by the user, or can be identified according to a unique random number that is associated with the IP address of the user device. Thus, the query data is not associated with and does not identify a particular user. Other anonymization processes, such as hashing, encryption and obfuscation techniques, can also be used to ensure that user privacy is protected.

In some implementations, the query data 108 associates queries with a session identifier for a session during which the queries were submitted. A session is a period of time during which a user submits queries. A session can be defined by a predetermined amount of time (e.g., 24 hours), a predetermined number of queries (e.g., 50 queries), or predetermined amounts of time during which the user does not submit a query (e.g., all queries submitted between breaks of at least five minutes).

In some implementations, the query data 108 also associates queries with resources viewed before the query was submitted. The resource can have been viewed by a user selecting a search result, by a user selecting a link from another resource, by a user manually entering a URL of a resource, or by a user selecting a bookmark corresponding to a resource. For example, if a user views a resource and then submits a query, the query data 108 can associate the resource with the query. In some implementations, the query data 108 further includes an amount of time between when the user viewed the resource and when the user submitted the query.

The resource scoring system 102 processes the resource data 106 and query data 108 using a resource scoring engine 110. The resource scoring engine 110 builds a resource graph representing the resources in the resource data 106 and the queries in the query data 108. Example resource graphs are described in more detail below with reference to FIGS. 2-4. The resource scoring engine then executes a scoring algorithm over the resource graph to generate scores for the web resources. The resource scoring system 102 stores the resulting scores in the score repository 112. Methods for generating the resource graphs and generating scores for the resources are described in more detail below with reference to FIG. 5.

The search engine 104 receives search queries from users. These search queries can be submitted, for example, from user devices connected to the search engine 104 through a network. The search engine 104 identifies and ranks search results responsive to the queries. As part of this ranking process, the search engine 104 uses the resource scores in the score repository 112. An example search engine is described in more detail below with reference to FIG. 6.

§2.0 Example Resource Graphs

Figure 2:
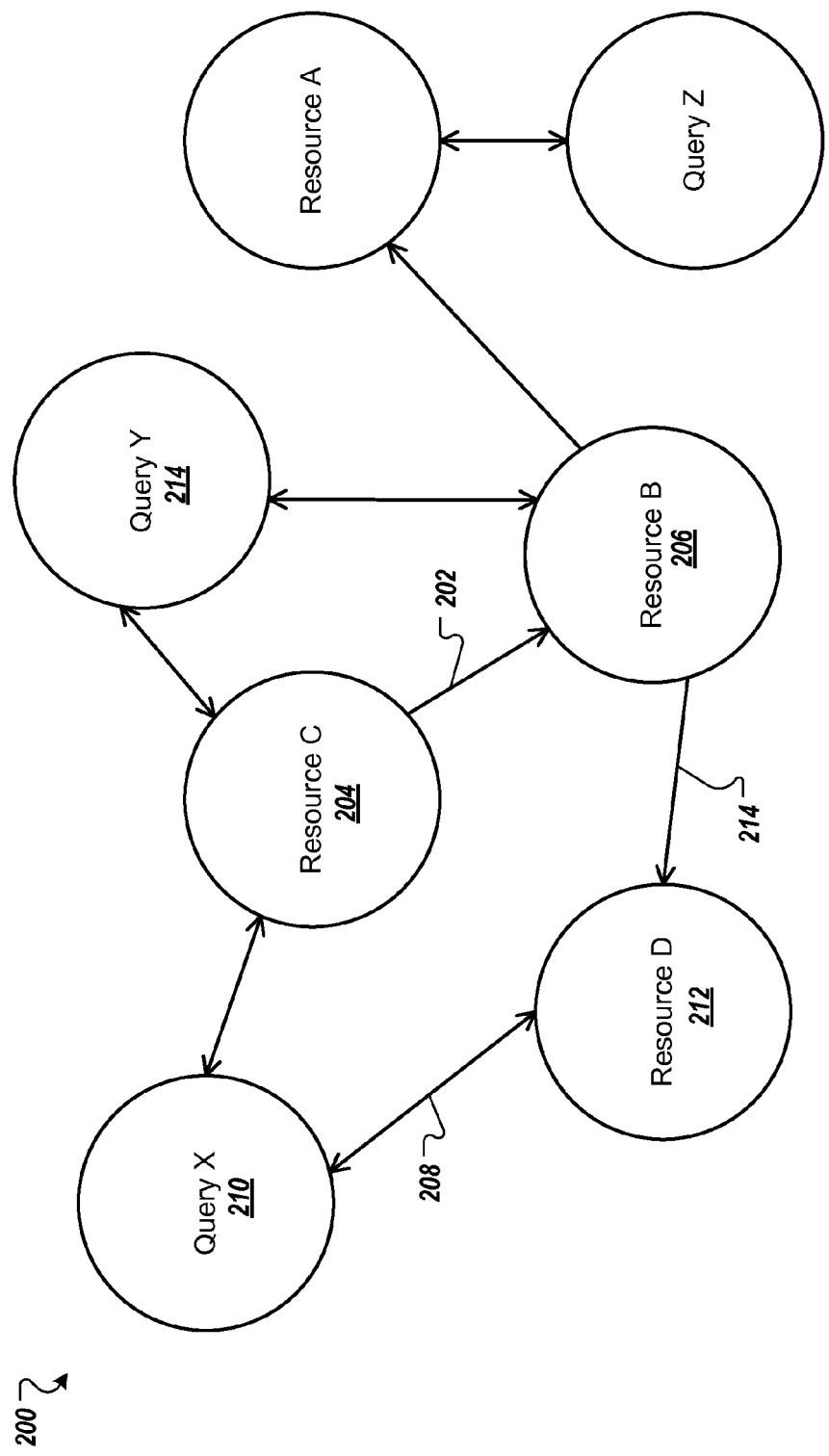
FIG. 2 illustrates an example resource graph having nodes representing resources and nodes representing queries.
Figure 3:
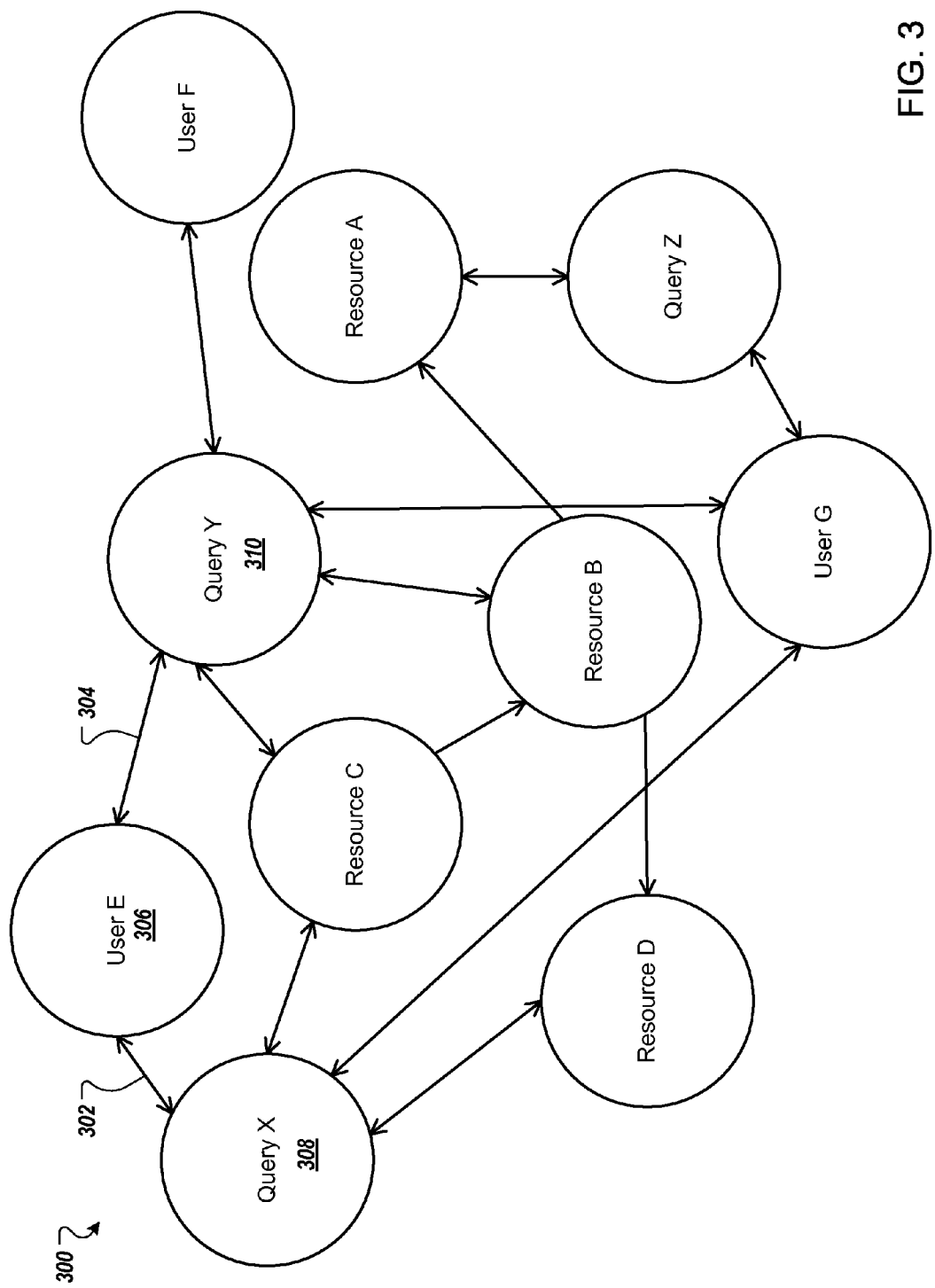
FIG. 3 illustrates an example resource graph having nodes representing resources, nodes representing queries, and nodes representing users.
Figure 4:
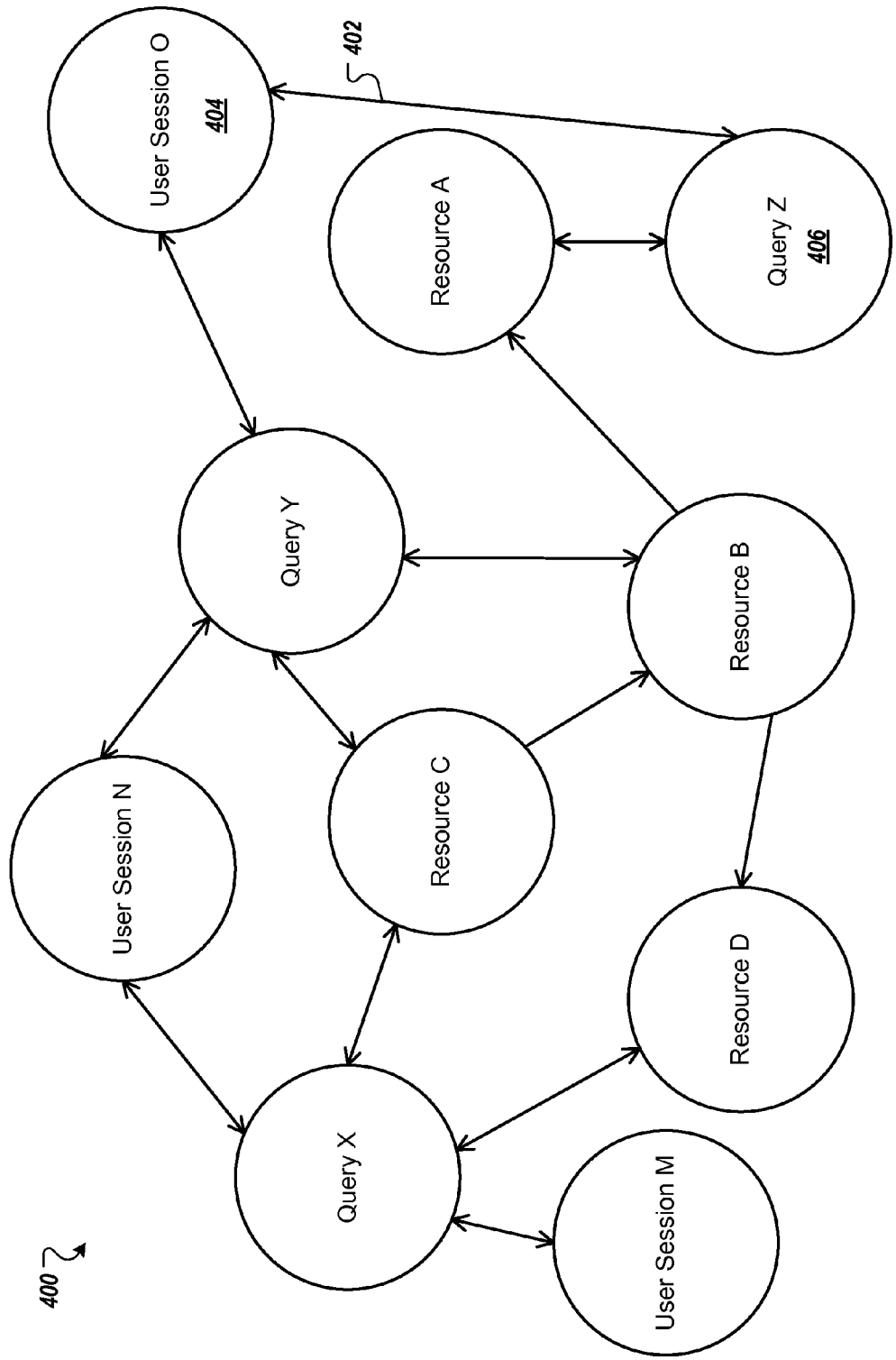
FIG. 4 illustrates an example resource graph having nodes representing resources, nodes representing queries, and nodes representing user sessions.

FIGS. 2-4 illustrate example resource graphs. Data representing the example resource graphs can be generated by the resource scoring system 102 and used to determine scores for resources represented by the nodes of the graph.

§2.1 Example Resource Graph with Resource Nodes and Query Nodes

FIG. 2 illustrates an example resource graph 200 having resource nodes representing resources and query nodes representing queries. The nodes are connected by two types of edges. One type of edge connects resource nodes. The other type of edge connects query nodes to resource nodes. The graph 200 does not have edges between query nodes.

Each edge from a node representing one resource to a node representing another resource represents a link, i.e., an anchor, from the first resource to the second resource. For example, the graph 200 includes an edge 202 from a node representing resource C 204 to a node representing resource B 206. The edge 202 represents the fact that resource C includes a link to resource B. The edges between resources are directed edges that run from the node representing the resource that contains a link to the node representing the resource that is linked to by the link.

Each edge between a node representing a query and a node representing a resource represents that a user selected a search result for the resource from a list of search results presented in response to the query. For example, the edge 208 between the node representing query X 210 and the node representing resource D 212 represents the fact that a user selected a search result corresponding to resource D from a list of search results responsive to query X. The absence of an edge between a resource node and a query node indicates that the resource was never selected as a search result for the query, or was selected less than a threshold number of times. In the example illustrated in FIG. 2, the edges between queries and resources do not have a specific direction. The edges can be represented by undirected edges or by two directed edges that have opposite directions.

In some implementations, the edges in the graph each have an associated weight. In some implementations, the edges between resource nodes have a weight derived from the number of outbound links from one of the resources to other resources. Various algorithms can be used to derive the appropriate weight for an edge from a node representing a first resource to a node representing a second resource. For example, the weight can be calculated by dividing the 1 by the number of outbound links from the first resource to other resources.

For example, resource C has one outbound link to resource B. Therefore, edge 202 between the node representing resource C 204 and the node representing resource B 206 has an associated weight of 1/1=1. Similarly, resource B has two outbound links, one to resource D and one to resource A. Therefore, edge 214 between the node representing resource B 206 and the node representing resource D 212 has an associated weight of 1/2=0.5.

Other algorithms for deriving the weight can also be used. For example, if the first resource has multiple links to the second resource, the weight for an edge from a first resource to a second resource can be calculated by dividing the number of links from the first resource to the second resource by the total number of outbound links from the first resource.

In some implementations, the edges between query nodes and resource nodes have a weight derived from a quality of result statistic for the resources and the queries. For example, the weight can be the quality of result statistic itself, or a value calculated from the quality of result statistic.

In general, a quality of result statistic for a resource and a query estimates how responsive users found the resource to be as a search result for the query. In some implementations, the system uses a click through rate for a resource and a query as the quality of result statistic for the resource and the query. The click through rate is the number of times users clicked on a search result for a resource when it is presented as being responsive to the query divided by the total number of times the search result was presented for the query. However, other quality of result statistics can also be used. For example, the quality of result statistic can also reflect the position of the result in the search results page, e.g., by giving a click on a lower positioned result a higher weight than a click on a higher positioned result. As another example, the quality of result statistic can further reflect the length of the clicks, e.g., how long a user viewed the resource after selecting the search result. Short clicks can be given less weight than long clicks.

In the example illustrated in FIG. 2, the edges between query nodes and resource nodes are undirected edges. However, in other implementations, the edges between queries and resources can be directed edges. For example, in some implementations, the edges are be directed edges from nodes for queries that users submitted to nodes for resources users selected. In these implementations, the weights for the edges can be derived, for example, as described above.

In some implementations, the edges are directed edges that follow user surfing behavior. For example, if a user submitted query X, selected resource C, and then submitted query Y, the edge from the node for query X 210 to the node for resource C 204 can be a directed edge from the query node to the resource node, and the edge from the node for resource C 204 to the node for query Y 214 can be a directed edge from the resource node to the query node. In some implementations, the edges are only included in the graph if more than a threshold number of users exhibited the behavior represented by the edge, or if the behavior was exhibited by users more than a threshold number of times. Directed edges from query nodes to resource nodes can have weights calculated as described above. Directed edges from resource nodes to query nodes can also have weights calculated as described above, or alternatively can have weights derived according to alternative heuristics, for example, based on the time between when users clicked on the search result for the resource and when the user submitted the query.

In some implementations, the weights of all outbound edges from a query node are normalized so that they sum to 1, and the weights of all outbound edges from a resource node to other resource nodes are normalized so that they sum to 1.

§2.2 Example Resource Graph with Resource Nodes, Query Nodes, and User Nodes

FIG. 3 illustrates an example resource graph 300 having resource nodes representing resources, query nodes representing queries, and user nodes representing users. The nodes are connected by three types of edges. One type of edge connects resource nodes, as described above with reference to FIG. 2. Another type of edge connects query nodes with resource nodes, as described above with reference to FIG. 2. The third type of edge connects user nodes with query nodes. The graph 300 does not have edges between query nodes or edges between user nodes.

Each edge between a node representing a user and a node representing a query represents the fact that a user submitted the query at some point during a user's search history. For example, the edges 302 and 304 from the node representing user E 306 to nodes representing query X 308 and query Z 310 represent the fact that user E submitted both query X and query Y. In the example illustrated in FIG. 3, the edges between nodes representing users and nodes representing queries do not have a specific direction. They can be represented by undirected edges or by two directed edges that have opposite directions. However, in other implementations, the edges between nodes representing users and nodes representing queries can be directed, e.g., directed from user nodes to query nodes.

In some implementations, the edges in the graph each have an associated weight. The edges between nodes representing resources and nodes representing queries and the edges between nodes representing resources can be derived as described above with reference to FIG. 2.

In some implementations, the weight for an edge between a node representing a user and a node representing a query is derived from the total number of times the user submitted the query. In other implementations, the weight is derived from the number of queries submitted by the user and/or the total number of users that submitted the query. For example, the weight can be derived by dividing 1 by the number of queries submitted by the user, or by dividing 1 by the number of users who submitted the query.

For example, edge 304 connects the node representing user E 306 and the node representing query Y 310. User E submitted two queries (query X and query Y). Therefore, the edge 304 can have the weight 1/2=0.5. Query Y was submitted by three users (user E, user F, and user G). Therefore, edge 304 could alternatively have the weight 1/3=0.33.

When an edge between a user node and a query node is represented by two directed edges, a weight can be calculated for each edge. For example, the weight for an edge from the user node to the query node can be derived from the number of queries submitted by the user, and the weight for an edge from the query node to the user node can be derived from the number of users who submitted the query.

In some implementations, the weights of edges from a user node to any query nodes are normalized so that they sum to 1.

§2.3 Example Resource Graph with Resource Nodes, Query Nodes, and User Session Nodes FIG. 4 illustrates an example resource graph 400 having resource nodes representing resources, query nodes representing queries, and session nodes representing user sessions. The use of session nodes, as opposed to user nodes, results in a slightly different configuration of the graph, as a single user will generally submit queries during multiple sessions. As user interests change over time, the types queries users submit during sessions can also change. The use of user nodes, as illustrated above with reference to FIG. 3, results in more data from which edges can be generated (all, or a large proper subset of all queries a user has submitted), while the use of session nodes provides data for possibly more focused groups of queries. The graph 300 does not have edges between query nodes or edges between user session nodes.

The nodes in the graph 400 are connected by three types of edges. One type of edge connects resource nodes, as described above with reference to FIG. 2. Another type of edge connects query nodes to resource nodes, as described above with reference to FIG. 2. The third type of edge connects session nodes to query nodes.

Each edge between a node representing a user session and a node representing a query represents the fact that the query was submitted during the user session. For example, the edge 402 from the node representing user session O 404 to the node representing query Z 406 represents the fact that query Z was submitted during users session O 404. In the example illustrated in FIG. 4, the edges between nodes representing user sessions and nodes representing queries do not have a specific direction. They can be represented by undirected edges or by two directed edges that have opposite directions. However, in other implementations, the edges between nodes representing user sessions and nodes representing queries can be directed, e.g., directed from user session nodes to query nodes.

In some implementations, the edges in the graph each have an associated weight. The edges between resource nodes and the edges between query nodes and resource nodes can be derived as described above with reference to FIG. 2. In some implementations, the weight for an edge between a session node and a query node is derived from the total number of times a user submitted the query represented by the query node during the session represented by the session node. In other implementations, the weight is derived from the number of queries submitted by the user during the user session and/or the total number of user sessions during which the query was submitted. For example, the weight can be derived by dividing 1 by the number of queries submitted during the user session, or by dividing 1 by the number of user sessions during which the query was submitted.

For example, edge 402 connects the node representing user session O 404 with the node representing query Z 406. Two queries (queries Y and Z) were submitted during user session O. Therefore, the weight for edge 402 can be derived from the number of queries submitted during user session O: 1/2=0.5. Alternatively, the weight for edge 402 can be derived from the number of user sessions in which query Z was submitted. Query Z was only submitted during user session O; therefore, the weight for edge 402 is 1/1=1.

When an edge between a session node and a query node is represented by two directed edges, a weight can be calculated for each edge. For example, the weight for an edge from the session node to the query node can be derived from the number of queries submitted during the user session represented by the session node, and the weight for an edge from the query node to the session node can be derived from the number of user sessions in which the query represented by the query node were submitted.

In some implementations, the weights of edges from a user session node to any query nodes are normalized so that they sum to 1.

§3.0 Example Process for Scoring Resources

Figure 5:
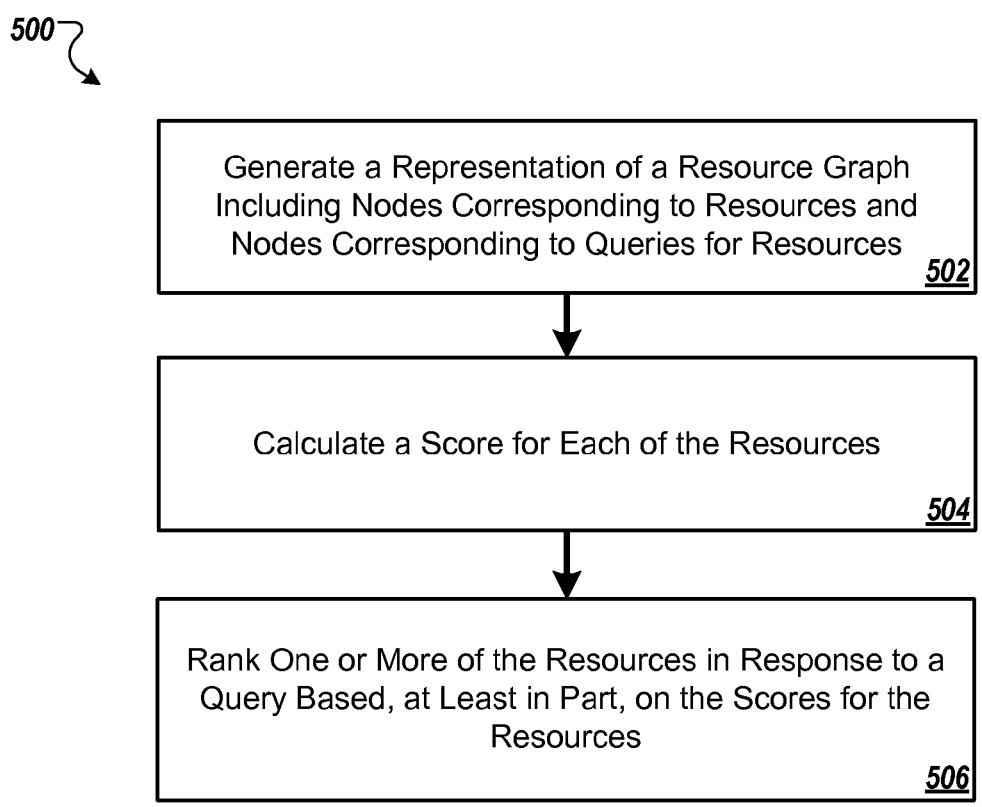
FIG. 5 is a flow diagram of an example process for generating a resource graph, using the resource graph to determine scores for resources, and ranking resources according to their scores.

FIG. 5 is a flow diagram of an example process 500 for generating a resource graph, using the resource graph to determine scores for resources, and ranking resources according to their scores. The process can be implemented, for example, by the system 100.

The process generates a resource graph (502). The resource graph includes nodes representing queries for resources and nodes representing resources, and edges between nodes representing resources and edges between nodes representing queries and nodes representing resources. The resource graph can also include nodes representing users or nodes representing user sessions, and links between the nodes representing users and/or user sessions to nodes representing queries. Example resource graphs and their relationship to resource data and query data are described above with reference to FIGS. 2-4.

The resource graph can be represented by data identifying the nodes and edges of the graph, and optionally weights for the edges of the graph. Conventional representations of graphs can be used.

The system can identify nodes, edges, and appropriate weights from edges from an analysis of data describing resources and queries, for example resource data 106 describing resources and query data 108 described above with reference to FIG. 1.

In some implementations, the system includes nodes in the resource graph for every query and resource identified in the data. In other implementation, the system filters out resources and queries that fail to satisfy predetermined criteria. For example, the system can filter out resources that have links from less than a threshold number of queries. As another example, the system can filter out queries that link to less than a threshold number of resources, that were submitted by less than a threshold number of users, or that were submitted in less than a threshold number of user sessions. Different thresholds can be used for the different criteria.

In implementations where the graph includes nodes for users or nodes for user sessions, the system can include nodes for each user or user session represented in the data, or can include nodes for just users or user sessions that satisfy predetermined criteria. For example, the system can filter out users that submit less than a threshold number of queries, or can filter out user sessions during which less than a threshold number of queries were submitted. Different thresholds can be used for the different criteria.

In some implementations, the system includes an edge between nodes representing a pair of resources in the resource graph whenever one of the resources links to the other resource at least once. In other implementations, the system only includes edges that satisfy one or more predetermined criteria. For example, the system can filter out an edge between two resources when the weight of the edge is less than a threshold.

In some implementations, the system includes an edge between a node representing a query and a node representing resource in the resource graph whenever the query is associated with the resource in the data at least once. In other implementations, the system only includes edges that satisfy one or more predetermined criteria. For example, the system can filter out an edge between a node representing a query and a node representing a resource when the total number of times a search result for the resource was selected by users from search results for the query is less than a threshold. As another example, the system can filter out edges between queries and resources if the edges have a weight that is less than a threshold.

In some implementations, the system includes an edge between a node representing a user (or user session) and a node representing a query in the resource graph whenever the user (or user session) is associated with the query in the query data. In other implementations, the system only includes edges that satisfy one or more predetermined criteria. For example, the system can filter out an edge between a user (or user session) when the number of times the query was submitted by the user (or during the user session) is less than a threshold. As another example, the system can filter out an edge between a user (or user session) when the weight of the edge is less than a threshold.

The process calculates a score for each of the resources (504). The score for a given resource is based on scores for resources that have an edge to the particular resource in the graph and scores for queries that have an edge to a node corresponding to the particular resource in the graph. Various conventional techniques that calculate scores for resources from a resource graph can be used. While these techniques traditionally operate on resource-only resource graphs, the same algorithms can be applied to graphs with query and resource nodes, as well as user nodes or session nodes. The resulting scores represent an overall quality of the resource.

In some implementations, the system calculates the scores for the resources as follows. First, the system determines an initial score for each node in the graph. For example, each node can be given a score of 1 divided by the total number of nodes in the graph. The system then iteratively updates the score of each given node in the graph to reflect the scores of the nodes with edges to the given node. An edge to a node is an edge connected to the node. If the edge is a directed edge, it is directed to the node. The update replaces the score of the given node with the weighted average of the scores of the nodes with edges to the given node. The weight for each score is the weight of the edge between the node and the given node. In some implementations, the updated score also reflects a dampening, or reset, factor that represents the probability that users stop navigating between resources and between resources and queries at any given resource or query. This dampening factor can represent the fact that users sometimes reset their navigation and search behavior, for example, by returning to a search engine webpage and entering a new search query unrelated to previous search queries. The dampening factor can be used to guarantee ergodicity of an underlying markov chain relied upon by the scoring process.

The system continues iteratively updating the scores of the nodes until a threshold condition is satisfied, for example, until a threshold number of iterations are performed or until the scores of the nodes change by less than a threshold amount.

When the graph includes nodes representing users or nodes representing sessions, these nodes, and their edges, are also be included in the score determination process.

The process ranks one or more of the resources in response to a query submitted by a user based, at least in part, on the scores for the web resources (506). For example, the scores can be used as query-independent measures of the resources by a search engine that is part of the system, as described below with reference to FIG. 6. The search engine can use conventional scoring algorithms that take the query-independent measure of the resource as input.

§4.0 Example Search System

Figure 6:
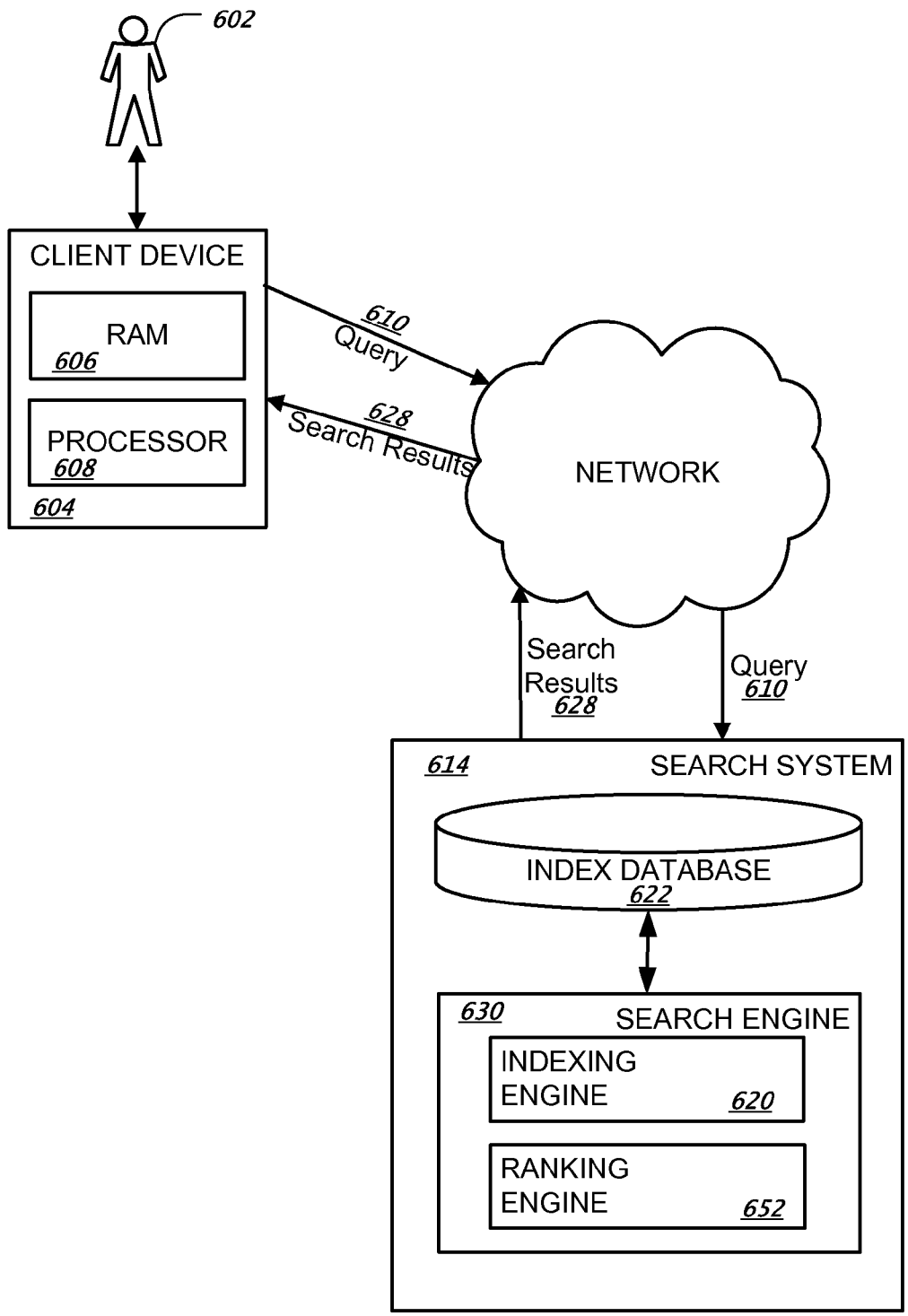
FIG. 6 illustrates an example search system.

FIG. 6 illustrates an example search system 614 for providing search results for resources relevant to submitted queries as can be implemented in an Internet, an intranet, or other client and server environment. The search system 614 ranks resources using scores calculated as described above with reference to FIG. 5. The search system 614 is an example information retrieval system.

A user 602 interacts with the search system 614 through a client device 604. For example, the client device 604 can be or include a computer (e.g., a personal computer, a mobile phone, etc.) coupled to the search system 614 through a wired or wireless local area network (LAN) or wide area network (WAN), e.g., the Internet. In some implementations, the search system 614 and the client device 604 are both implemented in the same machine. For example, a user can install a desktop search application on the client device 604. The client device 604 will generally include a random access memory (RAM) 606 and a processor 608.

A user 602 submits a query 610 to a search engine 630 within the search system 614. When the user 602 submits a query 610, the query 610 is transmitted through a network to the search system 614. The search system 614 can be implemented as, for example, computer programs running on one or more computers in one or more locations that are coupled to each other through a network. In some implementations, the search system 614 includes an index database 622 and a search engine 630. The search system 614 responds to the query 610 by generating search results 628, which are transmitted through the network to the client device 604 in a form that can be presented to the user 602 (e.g., in a search results web page to be displayed in a web browser running on the client device 604). For example, the search results can identify resources responsive to the user query.

When the query 610 is received by the search engine 630, the search engine 630 identifies resources that match the query 610. The search engine 630 will generally include an indexing engine 620 that indexes resources found by the search system 614, for example, resources found while crawling the Internet, an index database 622 that stores the index information, and a ranking engine 652 (or other software) to rank the resources that match the query 610, for example, according to a result score associated with each resource by the search engine 630. The result score can be a query-independent measure of the quality of the resource, a query-specific measure of how well the resource matches the query, or a score derived from both a query-independent measure and a query specific measure. The query-independent measure of the quality of the resource can be the score for the resource calculated as described above with reference to FIG. 5. The search engine 630 transmits the search results 628 through the network to the client device 604 for presentation to the user 602.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   generating, by a data processing apparatus, a resource graph, the resource graph including nodes representing resources, nodes representing queries for resources, edges between nodes representing resources, and edges between nodes representing queries and nodes representing resources, wherein each edge between two nodes representing respective resources represents a link from one of the resources to another one of the resources and each edge between a node representing a resource and a node representing a query represents a user selection of a search result for the resource from search results responsive to the query;
   calculating, by the data processing apparatus, a score for each of the resources, wherein the score for a particular resource is based, at least in part, on scores for resources represented by nodes with edges to a node representing the particular resource in the resource graph and scores for queries represented by nodes that have an edge to the node representing the particular resource in the resource graph; and
   ranking, by the data processing apparatus, one or more of the resources in response to a query received from a user based, at least in part, on the scores for the resources;
   wherein the resource graph further includes nodes representing user sessions and edges between nodes representing user sessions and nodes representing queries, wherein each edge between a node representing a user session and a node representing a query represents that a user associated with the user session submitted the query during the user session; and
   wherein a score for a particular query is based, at least in part, on scores for user sessions represented by nodes with edges to a node representing the particular query in the resource graph.

2. The method of claim 1, wherein an edge between a first node and a second node representing respective resources is a directed edge from the first node representing one of the resources to the second node representing another one of the resources.

3. The method of claim 1, wherein each edge has an associated weight, and calculating a score for a resource is further based on weights of the edges from nodes to the node representing the resource.

4. The method of claim 3, wherein the weight of an edge between a node representing a first resource and a node representing a second resource is derived from a number of outbound links from the first resource to other resources.

5. The method of claim 3, wherein the weight of an edge between a node representing a query and a node representing a resource is derived from a quality of result statistic for the resource and the query.

6. The method of claim 5, wherein the quality of result statistic for the resource and the query is a click through rate for the resource and the query.

7. The method of claim 1, wherein calculating the score for each of the resources includes iteratively updating the scores of web resources and queries.

8. The method of claim 7, wherein calculating the score for each of the resources comprises:
   initializing the score for each node in the resource graph, wherein the score for each node is one divided by a total number of nodes in the resource graph; and
   iteratively updating the score for each node, wherein the updated score for each node is derived from a weighted average of scores of nodes with edges to the node.

9. A system, comprising:
   a processor; and
   a computer storage medium encoded with instructions, which, when executed by the processor, causes the processor to perform operations comprising:
      generating a representation of a resource graph, the resource graph including nodes representing resources, nodes representing queries for resources, edges between nodes representing resources, and edges between nodes representing queries and nodes representing resources, wherein each edge between two nodes representing respective resources represents a link from one of the resources to another one of the resources and each edge between a node representing a resource and a node representing a query represents a user selection of a search result for the resource from search results responsive to the query;
      calculating a score for each of the resources, wherein the score for a particular resource is based, at least in part, on scores for resources represented by nodes with edges to a node representing the particular resource in the resource graph and scores for queries represented by nodes that have an edge to the node representing the particular resource in the resource graph; and
      ranking one or more of the resources in response to a query received from a user based, at least in part, on the scores for the resources;
   wherein the resource graph further includes nodes representing user sessions and edges between nodes representing user sessions and nodes representing queries, wherein each edge between a node representing a user session and a node representing a query represents that a user associated with the user session submitted the query during the user session; and
   wherein a score for a particular query is based, at least in part, on scores for user sessions represented by nodes with edges to a node representing the particular query in the resource graph.

10. The system of claim 9, wherein an edge between a first node and a second node representing respective resources is a directed edge from the first node representing one of the resources to the second node representing another one of the resources.

11. The system of claim 9, wherein each edge has an associated weight, and calculating a score for a resource is further based on weights of the edges from nodes to the node representing the resource.

12. The system of claim 11, wherein the weight of an edge between a node representing a first resource and a node representing a second resource is derived from a number of outbound links from the first resource to other resources.

13. The system of claim 11, wherein the weight of an edge between a node representing a query and a node representing a resource is derived from a quality of result statistic for the resource and the query.

14. The system of claim 13, wherein the quality of result statistic for the resource and the query is a click through rate for the resource and the query.

15. The system of claim 9, wherein calculating the score for each of the resources includes iteratively updating the scores of web resources and queries.

16. The system of claim 15, wherein calculating the score for each of the resources comprises:
   initializing the score for each node in the resource graph, wherein the score for each node is one divided by a total number of nodes in the resource graph; and
   iteratively updating the score for each node, wherein the updated score for each node is derived from a weighted average of scores of nodes with edges to the node.

17. A non-transitory computer-readable medium encoded with instructions, that when executed by a data processing apparatus, cause the data processing apparatus to perform operations comprising:
   generating a representation of a resource graph, the resource graph including nodes representing resources, nodes representing queries for resources, edges between nodes representing resources, and edges between nodes representing queries and nodes representing resources, wherein each edge between two nodes representing respective resources represents a link from one of the resources to another one of the resources and each edge between a node representing a resource and a node representing a query represents a user selection of a search result for the resource from search results responsive to the query;
   calculating a score for each of the resources, wherein the score for a particular resource is based, at least in part, on scores for resources represented by nodes with edges to a node representing the particular resource in the resource graph and scores for queries represented by nodes that have an edge to the node representing the particular resource in the resource graph; and
   ranking one or more of the resources in response to a query received from a user based, at least in part, on the scores for the resources;
   wherein the resource graph further includes nodes representing user sessions and edges between nodes representing user sessions and nodes representing queries, wherein each edge between a node representing a user session and a node representing a query represents that a user associated with the user session submitted the query during the user session; and
   wherein a score for a particular query is based, at least in part, on scores for user sessions represented by nodes with edges to a node representing the particular query in the resource graph.

18. A computer-implemented method, comprising:
   generating, by a data processing apparatus, a resource graph, the resource graph including nodes representing resources, nodes representing queries for resources, edges between nodes representing resources, and edges between nodes representing queries and nodes representing resources, wherein each edge between two nodes representing respective resources represents a link from one of the resources to another one of the resources and each edge between a node representing a resource and a node representing a query represents a user selection of a search result for the resource from search results responsive to the query;
   calculating, by the data processing apparatus, a score for each of the resources, wherein the score for a particular resource is based, at least in part, on scores for resources represented by nodes with edges to a node representing the particular resource in the resource graph and scores for queries represented by nodes that have an edge to the node representing the particular resource in the resource graph; and
   ranking, by the data processing apparatus, one or more of the resources in response to a query received from a user based, at least in part, on the scores for the resources;
   wherein the resource graph further includes nodes representing users and edges between nodes representing users and nodes representing queries, wherein each edge between a node representing a user and a node representing a query represents that the user submitted the query; and
   wherein a score for a particular query is based, at least in part, on scores for users represented by nodes with edges to a node representing the particular query in the resource graph.

19. A system, comprising:
   a processor; and
   a computer storage medium encoded with instructions, which, when executed by the processor, causes the processor to perform operations comprising:
   generating a resource graph, the resource graph including nodes representing resources, nodes representing queries for resources, edges between nodes representing resources, and edges between nodes representing queries and nodes representing resources, wherein each edge between two nodes representing respective resources represents a link from one of the resources to another one of the resources and each edge between a node representing a resource and a node representing a query represents a user selection of a search result for the resource from search results responsive to the query;
   calculating a score for each of the resources, wherein the score for a particular resource is based, at least in part, on scores for resources represented by nodes with edges to a node representing the particular resource in the resource graph and scores for queries represented by nodes that have an edge to the node representing the particular resource in the resource graph; and
   ranking one or more of the resources in response to a query received from a user based, at least in part, on the scores for the resources;
   wherein the resource graph further includes nodes representing users and edges between nodes representing users and nodes representing queries, wherein each edge between a node representing a user and a node representing a query represents that the user submitted the query; and
   wherein a score for a particular query is based, at least in part, on scores for users represented by nodes with edges to a node representing the particular query in the resource graph.

* * * * *